Oct. 29, 1940.   G. E. BEHARRELL ET AL   2,219,466
CONTROL VALVE FOR FLUID MOTORS
Filed March 23, 1940   3 Sheets-Sheet 3

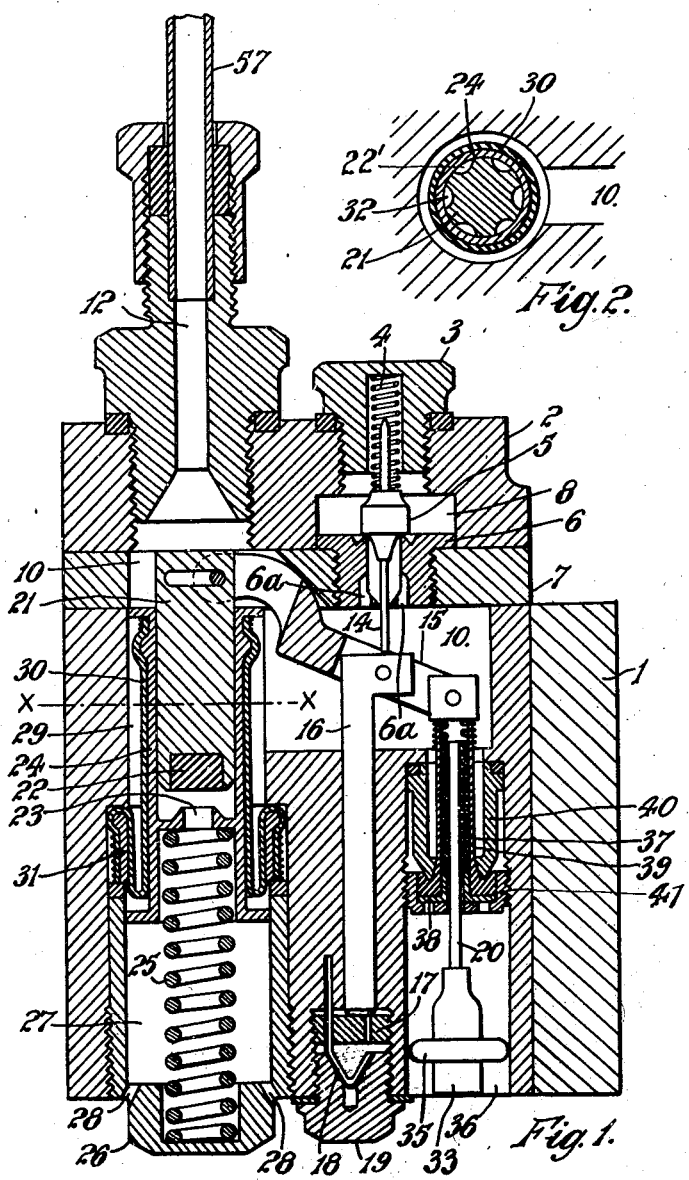

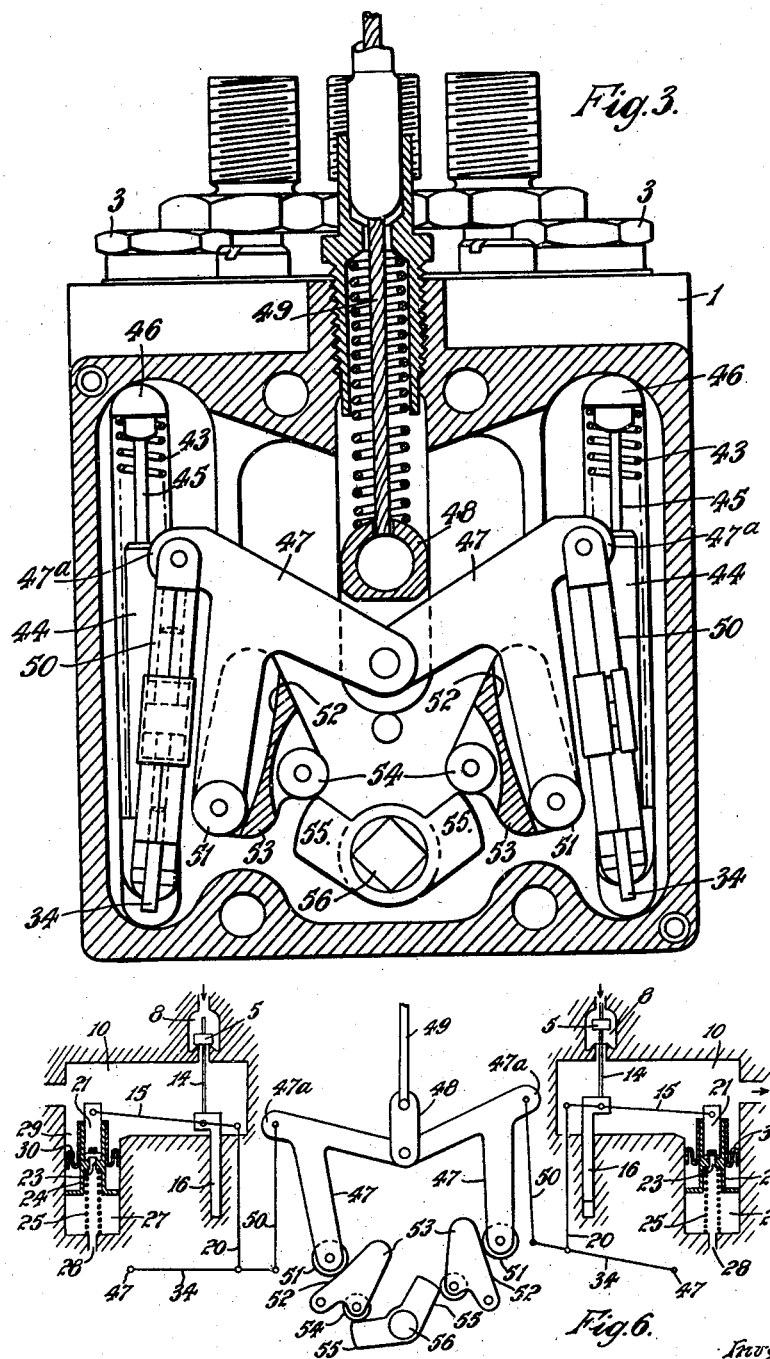

Patented Oct. 29, 1940

2,219,466

UNITED STATES PATENT OFFICE 2,219,466

CONTROL VALVE FOR FLUID MOTORS

George Edward Beharrell, Streetly, Joseph Wright, Stoke Park, Coventry, and Henry Trevaskis, Sutton Coldfield, England, assignors to Dunlop Rubber Company Limited, London, England, a British company Application March 23, 1940, Serial No. 325,570
In Great Britain January 19, 1939

8 Claims. (Cl. 303—6)

This invention concerns improvements in or relating to fluid-pressure apparatus for controlling the operation of brakes on aircraft, and is an improvement in or modification of the invention set forth in our co-pending application Ser. No. 245,006, filed December 10, 1938, now Patent 2,200,829, issued May 14, 1940.

The present invention has for its object to modify and adapt the apparatus described in the said specification to enable aircraft brakes to be operated by the use of compressed air or like gaseous fluid.

In particular the invention concerns pneumatic apparatus for controlling the supply of fluid at equal or unequal breaking pressures to two or more brakes or groups of brakes on opposite sides of the aircraft, the said supply being fed under pressure from a reservoir to the apparatus.

The brake applying means to which the compressed air or the like is supplied may each consist of a spring loaded annulus which is expanded by fluid-pressure to cause the brake shoes to move radially into braking contact with a brake drum the springs serving to collapse the annulus and thereby exhaust the fluid when the brakes are inoperative.

The invention facilitates the control of brake pressure by relieving the pilot of the physical effort required to overcome the resistance of spring loaded valves, the necessary force for this purpose being provided by the pressure fluid itself.

A further feature of the invention is the ability to obtain a progressively varying ratio of brake pressure between brakes on opposite sides of the aircraft consequent upon deflection of the rudder bar.

According to our invention, the plug or member for controlling the closing and opening of the exhaust orifice is axially slidable in a slidably mounted spring-loaded sleeve provided with an exhaust orifice, and channels or the like are provided between the plug and the spring-loaded sleeve through which channels the fluid is exhausted when the exhaust orifice is opened.

The spring loaded sleeve is sealed from leakage, whilst permitting free axial sliding movement, by a flexible bag or sleeve which is attached at one end to the sliding sleeve whilst the opposite end is held.

The various features of the invention are illustrated by way of example in the accompanying drawings in which:

Fig. 1 is the sectional elevation of a control unit embodying the invention.

Fig. 2 is a section on the line X—X of Fig. 1.

Fig. 3 is a front view of the control unit with the cover plate removed, and parts in vertical section.

Fig. 6 illustrates, diagrammatically, the connections between the main component parts of the unit.

Figure 4:
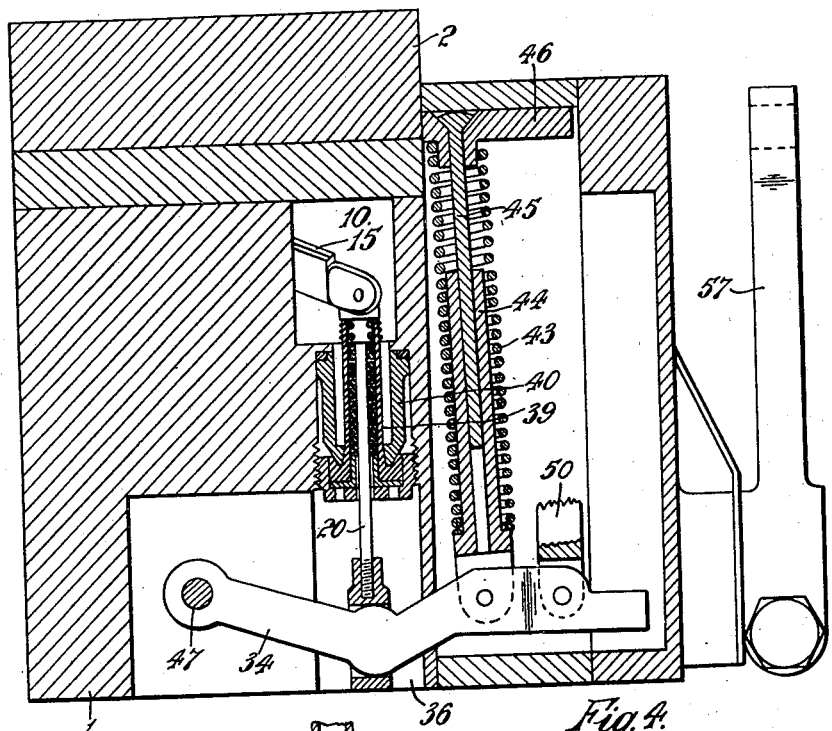
Fig. 4 is a sectional end elevation of the control unit.
Figure 5:
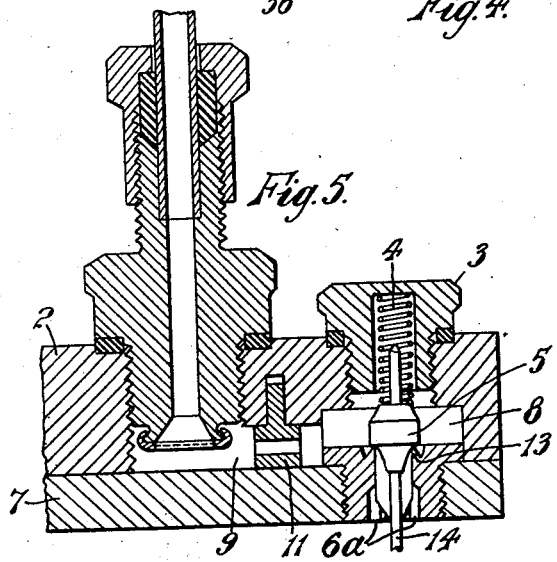
Fig. 5 is a sectional elevation showing the pressure feed pipe and communication with the inlet valve unit.

In the embodiment of the invention shown in the accompanying drawings a casing 1 having a top cover part 2 is formed with cylindrical holes which are spaced apart along parallel axes and each of which receives a screwed plug or cap 3 carrying a light compression spring 4 for loading an inlet valve member 5. The component part of each inlet valve unit comprises a body 6 screw-threaded into a hole in a plate 7 located between the casing and cover parts. An enlarged annular groove or recess 8 is formed in the cover part between the two parts of each valve unit, and the groove registers with an inlet port 9 formed in the cover part through which port compressed air is admitted to fill the annular chambers 8 between the valve parts of their respective valves. The spring loaded valves 5 normally prevent air from flowing from their respective chambers 8 into respective pressure distributing chambers 10 in the casing and cover. A baffle member 11 is located in the port 9 to limit the air flow so that excess pressure will not be built up in the chambers 10. Each of the pair of pressure-distributing chambers 10 has an outlet port 12 which is connected to one of the brakes, or groups of brakes, at each side of the aircraft.

The spring loaded valves 5 each have a rubber or like resilient sealing surface which coacts with an upstanding edge 13 surrounding the axial bore of the lower valve body 6, to seal the annular chamber 8 from said pressure distributing chamber 10.

The spring loaded valve member has a depending stem or spindle portion 14 below said sealing portion, and this stem or spindle slidably engages a hole of reduced diameter at the base of the lower valve unit body. When the valve is open the air flows from the chamber 8 into the chamber 10 through the bore of the body 6 and through the holes 6a which cut into such bore.

In the inoperative position, i. e. with the brakes "off," each spring loaded valve member 5 seals its respective aperture in the lower body 6 of the valve unit, and such valve member is normally held on its seating by the spring 4 and by the pressure of the fluid in the annular chamber 8, but is displaceable from its seat by thrust exerted on the valve spindle 14 by means of a rocking lever 15, or part coupled thereto. The rocking lever has its major portion inclined at an angle to the said spindle.

Each valve spindle 14 normally rests on the head of one of a pair of rods 16 or members which are slidably mounted in the main casing 1, and the lower end of this rod or member abuts against a ring or plug 17 screwed in a hole in the base of said casing to enable the opening and closing of the inlet valve to be adjusted. Each plug or ring is adapted to be locked in the adjusted position by means of a peg 18 engaging a hole in the casing 1 and in one of a series of holes in the plug or ring. The peg is shaped to facilitate its removal and is held in position by a plug 19 screwed in the hole receiving said ring.

One end of each rocking lever 15 is pivoted to one of a pair of thrust rods 20 which slides along an axis substantially parallel to that of the inlet valve units. The other end of each rocking lever is pivotally and also slidably connected to one end of one of a pair of exhaust valve plungers 21, the free end of which carries a rubber or like sealing block 22, which is adapted, in the normal inoperative position of the parts, to lie clear of the upstanding edge of one of a pair of orifices 23 constituting exhaust ports formed in respective sleeves 24. Each sleeve is spring loaded by means of a compression spring 25 which bears at one end against the underside of a recess in the sleeve, and at the other end against a cap 26 screwed in the base of the casing. Each cap has an upstanding cylindrical extension which forms a guide for the flanged lower end of its respective spring loaded sleeve. The said sleeves 24 are capable of axial movement along axes which are offset from and are between and parallel to the axes of the inlet valves 5, and an exhaust chamber 27 is provided below each sleeve, and such chambers are open to the atmosphere through a hole or holes 28 in said cap 26.

The external diameter of each slidable exhaust sleeve 24 is considerably less than the diameter of the bore 29 in the casing, and leakage of compressed fluid is prevented by means of a rubber or other flexible bag or sleeve 30 which, at one end, is engaged over and bound to an enlargement at the upper end of the exhaust sleeve 24, the opposite end of such flexible sleeve being clamped between the main casing 1 and the external surface of a bush member 31 which is pressed axially against a shoulder in the casing by the aforesaid cap 26 which restrains the exhaust sleeve spring 25. A rubber or like sealing washer is arranged between the bush 31 and the end of the cylindrical extension on the cap 26.

This flexible bag or sleeve 30 permits the spring loaded exhaust sleeve 24 to slide axially whilst maintaining an air-tight joint between the sleeve and the casing, and prevents escape of compressed air except when the exhaust valve plunger 21 is raised clear of its seating, as hereinafter described.

Each exhaust valve plunger 21 is provided with a series of longitudinally arranged surface grooves 22' to form a plurality of conduits between the plunger 21 and the sleeve 24 in which it slides, through which conduits the compressed air exhausts to atmosphere when the brakes are released.

Each of the aforesaid slider members 16 for operating its inlet valve spindle 14 is connected to one of a pair of rocking levers 15 at a point substantially nearer the end of the lever which is pivoted to the thrust rod 20 than to the end of the lever connected to the exhaust valve plunger 21, in order to provide the mechanical advantage necessary to ensure ease of displacement of the inlet valves 5 against the high pressure of the compressed air supply acting against each valve.

Each aforesaid thrust rod 20 has a bifurcated jaw member at the upper end which is pivotally connected to one end of its respective rocking lever 15. The lower end of this rod has a member 33 fixed thereto which is slotted at one side to form shoulders or abutments which coact with a pivoted operating lever 34 as hereinafter described. The slotted member 33 carries a circular lip 35 or the like which slidably engages a bore 36 in the main casing 1 to guide the lower end of the thrust rod 20 and to permit the same to tilt slightly during its axial movement.

In order to maintain a fluid-tight seal around each thrust rod 20, and to prevent escape of compressed air from the pressure distributing chambers 10, whilst permitting the thrust rod to tilt due to its connection to the rocking lever 15, flexible sealing means are provided which surround the rod and are fixed at two points spaced apart. A tightly wound coil spring 37 is anchored at one end of the bifurcated jaw member at the top of the thrust rod, whilst the opposite end of the spring rests on a metal sleeve 38 fitted freely over the rod, or to the rod itself at or near its lower end. The spring anchorage members may be grooved to receive the end coil or coils of the spring. A rubber or like flexible sleeve 39 is positioned over said spring, and the upper end is suitably bound in position over the upper end of the spring and bifurcated jaw member. The lower end of this rubber sleeve is flanged outwardly and the flange has an annular recess in the top face, which recess is concentric with the axis of the sleeve. The flanged end of the rubber sleeve is forced over the lower end of the spring 37, and the flat lower end face of the sleeve and flange abut against the face of a flange on the metal sleeve 38 which locates the lower end of the spring.

The flanged lower end of the rubber sleeve 39 is clamped between a brass or other metal sleeve 40 loosely engaged in the aforesaid bore 36 in the casing 1 and a ring or collar 41 screwed in said bore. This clamping sleeve is provided at the lower end with a tapered portion which engages the aforesaid annular recess in the flanged end of the rubber sleeve, whilst the upper end of such clamping member is grooved or reduced in diameter externally to coact with a rubber sealing ring 42 positioned against a shoulder formed at the upper end of the bore 36 receiving the sleeve.

As aforestated, each thrust rod 20 has a notched member at the lower end which is contacted by a shoulder or enlargement formed on the intermediate portion of one of the pair of operating levers 34 each of which levers is returned by a compression spring 43 positioned along an axis substantially parallel to that of the rod.

The return spring 43 is guided by a tube 44 carried by the lever and telescopically engaged with a pin or member 45 depending from a carrier piece 46 fitted in a recess in the front cover of the apparatus.

Each operating lever 34 is pivoted to the casing 1 by means of the screwed pins 47 so as to be movable at right angles to the thrust rod 20 contacting therewith.

Equal or unequal movement about their pivots is imparted to each of the operating levers 34, and consequently to the thrust rods 20 and to the rocking levers 15 by a symmetrical linkage comprising a pair of links 47 of elbow shape, the shorter arms of which elbow links are pivoted together and to one end of a slidably mounted clamp 48, to the other end of which a cable 4ъ is detachably secured.

The elbow links are normally symmetrically arranged about an axis extending midway between and parallel to the axes of the compressed air inlet valves 5, and the clamp to which the cable is attached is movable along its axis by tension applied to the cable by a finger lever to which the remote end of the cable is attached. The elbow links each have an extension 47a at the corner to which is pivotally connected a rod or member 50 having its opposite end pivotally connected to the respective operating lever 34. The rods 50 are of adjustable length.

The free or lower end of the longer arm of each elbow link 47 is provided with flat faces and with rollers 51 of discs form rotatable on a spindle passing through the said faces at right angles. The peripheries of these elbow link rollers make rolling contact with an arcuate cam surface 52 formed by the inner edge surface of a notch or groove in the base of a three-sided cradle shaped member 53. The axis of the spindle of each pair of elbow link rollers 51, when the elbow links are in the inoperative position, coincides with the axis of a pair of trunnions which extend outwardly from the sides of the cradle shaped members 53, and such trunnions carry sleeves which engage bearing recesses in the casing 1 and its front cover plate.

Each cradle shaped member 53 is provided adjacent its rear centre with a roller 54 which contacts one of a pair of rocker arms or cams 55 projecting radially from a cam-shaft 56 rotated by a crank lever 57 linked to the rudder bar. The cam-shaft 56 is positioned for partial rotation in the mid-plane of the casing and along an axis at right angles to the axes of the inlet valves 5.

Assuming the parts of the device to be in the inoperative position and the brakes "off," the operation of the device is as follows:

The sealing disc or member 5 of each inlet valve is held on its seat by the spring 4 and by the air pressure in the annular chamber 8, and the end of the valve spindle 14 is slightly clear of, or is resting loosely on, the head of the slider 16 which is connected to the rocking lever 15.

The spring loaded outlet or exhaust sleeve 24 is at its highest position, and the seat of the exhaust opening 23 is clear of the rubber sealing block 22 in the end of the exhaust valve plunger 21, thus maintaining an open circuit between the brakes and the atmosphere and permitting any air under pressure in the brakes to exhaust through the aperture 23 in the spring loaded sleeve and to the atmosphere via the holes 28 in the cap 26 fitted beneath the exhaust sleeve spring 25.

When the pilot tensions the cable 49 to apply the brakes equally, the rocker arms or cams 55 and the cradle shaped members 53 are stationary about the axes of their trunnions, and the rollers 51 at the end of each of the longer arms of the elbow links 47 ride up the equally inclined arcuate cam surface 52 on the cradle shaped members 53, so that equal movement is applied to the operating levers 34 and thrust rods 20. The thrust rods are displaced against their return spring 43 and the rocking levers 15 are deflected with the following effects:

Each rocking lever rises slightly so that the head of the slider 16 contacts the inlet valve spindle 14 and, as this valve is held on its seat by air at high pressure, the opposite end of the lever 15 carrying the exhaust valve plunger 21 dips so that the rubber block 22 in said plunger closes the exhaust orifice 23. Further movement of the thrust rod 20, due to increased cable tension, causes the rocking lever 15 to pivot about that end which is connected to the exhaust valve plunger 21 and, owing to the mechanical advantage obtained by shifting the lever pivot, the slider 16 is caused to move upwardly to contact with and displace the inlet valve sealing disc or member 5 off its seat 13. Thus the inlet valves are open and the exhaust valves are closed.

Air under pressure then flows into each distributing chamber 10 and builds up pressure there and also in the brake or brakes to which each chamber is connected. The pressure acting on the surface of the flexible bag 30 and on the end of the spring loaded exhaust sleeve 24 and on the exhaust valve plunger 21 moves these latter parts downwards against the spring load, the exhaust orifice 23 remaining closed. This causes the rocking lever 15 to tilt about its connection to the thrust rod 20, and thus the slider 16 attached to the lever 15 is pulled downwardly away from the inlet valve spindle 14, which thereby permits the inlet valve to re-seat itself, whereby a definite pressure is retained in the brake corresponding to the particular position of the brake applying hand lever and linkage connected thereto consisting of the elbow links 47, push or connecting rod 50 and thrust rod 20.

The inlet and exhaust ports are out of register with each other, which arrangement prevents a direct flow of air under pressure on to the end surface of the exhaust sleeve and plunger or pressure controlling means when the inlet valve is first opened.

To release the brakes, the pilot relieves the tension on the cable 49 whereupon the thrust rods 20 and rods 50 connecting the levers 34 and links 47 are returned by spring pressure, and the rocking levers 15 assume a free position in which the inlet valve spindles 14 rest on, or lie just clear of the top edges of the slider members 16. Each inlet valve remains seated, but the rubber plug 22 in the end of each exhaust valve plunger 21 leaves the apertured seat 23 in the spring loaded exhaust valve sleeve 24, whereupon the air under pressure in the brakes exhausts to the atmosphere through the feed pipes 57, distributing chambers 10, conduits 32 between the exhaust valve sleeve 24 and plunger 21, exhaust orifice 23 and the holes 28 in the cap 26 below the exhaust valve sleeve.

When it is desired to apply the brakes unequally such as when steering the aircraft on the ground, the rocker arms or cams 55 are deflected by partial rotation of the cam-shaft 56 due to operation of the rudder, and the cradle shaped members 53 are caused to assume positions which are asymmetrical relative to the midplane of the casing, with the effect that the movement imparted to the levers 34 and thrust rods 20 at one side is unequal to the movement imparted to the levers and rods on the opposite side, and unequal brake pressure is obtained, such an arrangement is diagrammatically illustrated in Figure 6 wherein, for instance, the right hand brake is to be fully applied, whilst the left hand brake is not to be applied. To effect this the rudder bar is turned hard over to the right whereby the cam-shaft 56 is rotated so that the cams or rocker arms 55 cause the left hand member 53 to move inwards to its lowest position, whilst the other member 53 is forced outwardly so that its cam face 52 is at a relatively steep inclination. When the cable 49 is tensioned, the rollers 51 on the elbow links 47 ride up the cam surfaces 52 and, owing to the fact that the right hand cam is steeper than the other, the rod or member 50 connected to the right hand elbow link 47 will move axially and the lever 34 connected to such rod will thus be pivoted about its pivot pin 47, thereby operating the thrust rod 20 and rocking lever 15, to open the inlet valve 5 and close the exhaust orifice 23, as aforedescribed.

The left hand link 47 will pivot about its connection to the upper end of the connecting rod 50, and the roller 51 on such link will thus roll up the surface on the left hand cam member 53. The rod 50 is itself pivotally connected to the end of the lever 34, and therefore movement of the left hand link 47 and the roller 51 does not produce any linear movement of the connecting rod 50 or any pivotal movement of the left hand operating lever 15. Thus the inlet valve at the left hand side of the unit is not opened and no pressure fluid is admitted to the left hand brake.

With the arrangements according to this invention the brake pressures are always strictly proportional to the angular movement imparted to the operating levers and links connected thereto, and, as such parts are under the direct control of the pilot or other operator, very accurate braking can be obtained. Furthermore, as there are no heavily spring loaded valves to be opened by mechanical pressure and/or linkages, a very fine control of the brake applying lever can be obtained.

The method of obtaining a differential movement of the elbow links 47 and members connected thereto for differentially operating the levers 34 controlling the movements of the rocking levers 15 from the movement of the rudder bar, also enables perfectly proportional differential braking pressures to be applied to brakes or groups of brakes on each side of the aircraft for the purpose of steering the craft on the ground.

What we claim is:

1. Apparatus of the type described which comprises a distributing chamber having an inlet valve and an outlet valve, a floating lever attached at one end to said outlet valve and movable to open said inlet valve, an actuating rod extending into said chamber and attached to the opposite end of said lever from said outlet valve, a flexible sleeve secured to said rod and to said distributing chamber to permit said actuating rod to move and to tilt within said sleeve.

2. Apparatus of the type described which comprises a casing having formed therein a distributing chamber and a port leading from said distributing chamber and a pair of spaced cylindrical passages, a slidable resiliently supported exhaust port in one of said cylindrical passages, a valve slidable to and from said exhaust port, an actuating rod slidable in the other of said cylindrical passages, a flexible sleeve secured between the actuating rod and the cylindrical passage in which it moves to permit tilting of said rod, a lever between said exhaust valve and said actuating rod, an inlet valve to said distributing chamber, means for resiliently pressing said inlet valve to closed position and a stop secured to said lever to open said inlet valve when said outlet valve is seated and said actuating rod is moved toward said inlet valve.

3. The apparatus of claim 2 in which said stop is slidably mounted in a recess in said casing and having an adjustable support therein.

4. Apparatus of claim 2 in which said stop is offset from the inlet valve.

5. Apparatus of claim 1 in which said distributing chamber has a cylindrical passage to contain said actuating rod and in which said actuating rod has a circular member movable in said cylindrical recess to guide said rod.

6. Apparatus of the type described which comprises a distributing chamber having an inlet valve, an outlet valve and a cylindrical passage, a floating lever in said chamber attached at one end to said outlet valve and movable to open said inlet valve, an actuating rod in said cylindrical passage extending into said chamber and attached to the opposite end of said lever from said outlet valve, a collar in said cylindrical passage and spaced from said actuating rod and having an annular bevelled edge at its free end, a stretchable tube having a flange beneath the bevelled edge of said collar and extending upwardly about said rod to said floating lever, a ring threaded into said cylindrical passage to clamp said flange of said tube against the bevelled edge of said collar and secured to its upper end about said actuating rod to seal said cylindrical passage from said chamber about said rod and to permit said rod to tilt freely and to move axially.

7. Apparatus of claim 6 having a spring attached at one end to said ring and at the opposite end to said actuating rod.

8. Apparatus of the type described which comprises a distributing chamber having an outlet valve, an inlet valve, a thrust rod, a floating lever connecting said thrust rod and said outlet valve, said inlet valve being positioned between said connections, a supporting stop for said floating lever and said inlet valve, said stop being slidably mounted in said chamber, and an adjusting screw to adjust the position of said stop.

GEORGE EDWARD BEHARRELL.
JOSEPH WRIGHT.
HENRY TREVASKIS.